US007242907B2

(12) United States Patent  
Garrison et al.

(10) Patent No.: US 7,242,907 B2  
(45) Date of Patent: Jul. 10, 2007

(54) SYSTEM AND METHOD FOR INBAND SIGNALING FOR SECTOR SYNCHRONIZATION IN A WIRELESS COMMUNICATION SYSTEM

(75) Inventors: G. Jack Garrison, New Minister (CA); Robert B. Foster, Jr., Bellevue, WA (US)

(73) Assignee: Harris Corporation, Melbourne, FL (US)

( * ) Notice: Subject to any disclaimer, the term of this patent is extended or adjusted under 35 U.S.C. 154(b) by 441 days.

(21) Appl. No.: 10/433,829

(22) PCT Filed: Dec. 10, 2001

(86) PCT No.: PCT/US01/47152

§ 371 (c)(1),  
(2), (4) Date: Oct. 14, 2003

(87) PCT Pub. No.: WO02/47288

PCT Pub. Date: Jun. 13, 2002

(65) Prior Publication Data

US 2004/0053620 A1   Mar. 18, 2004

(51) Int. Cl.  
*H04B 1/00*   (2006.01)

(52) U.S. Cl. .................. 455/63.1; 455/63.2; 455/63.3; 455/63.4; 370/503

(58) Field of Classification Search .................. 455/62, 455/524, 63.1, 25, 101, 103, 60, 422.1, 517, 455/561, 562.1, 450, 452.1, 446, 447, 17, 455/63.2, 63.3, 63.4; 343/853, 893; 342/361; 370/329, 337, 503; 375/285, 346, 354, 356  
See application file for complete search history.

(56) References Cited

U.S. PATENT DOCUMENTS

| 5,428,818 | A | 6/1995 | Meidan et al. |
| 5,642,348 | A * | 6/1997 | Barzegar et al. ............ 370/277 |
| 5,809,431 | A | 9/1998 | Bustamante et al. |
| 5,841,766 | A | 11/1998 | Dent et al. |
| 6,016,311 | A | 1/2000 | Gilbert et al. |
| 6,052,582 | A | 4/2000 | Blasing et al. |
| 6,128,276 | A | 10/2000 | Agee |
| 6,256,486 | B1 | 7/2001 | Baranay et al. |
| 6,330,458 | B1 | 12/2001 | Lamoureux et al. |
| 6,473,616 | B1 * | 10/2002 | Sydor ......................... 455/446 |
| 2001/0002196 | A1 * | 5/2001 | Fellman et al. ............. 370/442 |

OTHER PUBLICATIONS

Propagation Data and Prediction Methods Required or the Design of Terrestrial Line-of-sight Systems Rec. ITU-R P. pp. 530-536.  
Prediction Procedure for the Evaluation of Microwave Interference Between Stations on the Surface of the Earth at Frequencies Above About 0.7 GHZ Rec. ITU-R. pp. 452-458.  
The Analysis of the Co-Existence of two FWA Cells in the 24.5-26.5 GHz and 27.5-29.5 GHz bands. ERC Report 099.

(Continued)

*Primary Examiner*—Nay Maung  
*Assistant Examiner*—Dominic Rego  
(74) *Attorney, Agent, or Firm*—Duane Morris LLP

(57) ABSTRACT

The present invention relates to communication systems and methods and more particularly to a system and method for optimizing the bandwidth of a point to multipoint wireless system by synchronizing transmit and receive modes of various hubs and sectors. The inventive method and system provides an optimal guard time between transmit and receive modes. Moreover, the inventive system and method utilizes a control channel located in a guard space associated with a data channel to provide synchronization telemetry to facilitate dynamically variable transmit and receive modes.

43 Claims, 15 Drawing Sheets

OTHER PUBLICATIONS

Use of the band 24.5-26.5 GHz for fixed wire-less access. CEPT/ERC/REC 00-05.

Matthew Chang Justin Chuang Recommended Practice for Co-Existence of Broadband Wireless Access Systems. IEEE 802.16.2.

Distributed Measurement-based Quasi-fixed Frequency Assignment for Personal Communications. ICC '95 Seattle vol. 1, 18-22 Jun. 1995, pp. 433-437.

* cited by examiner

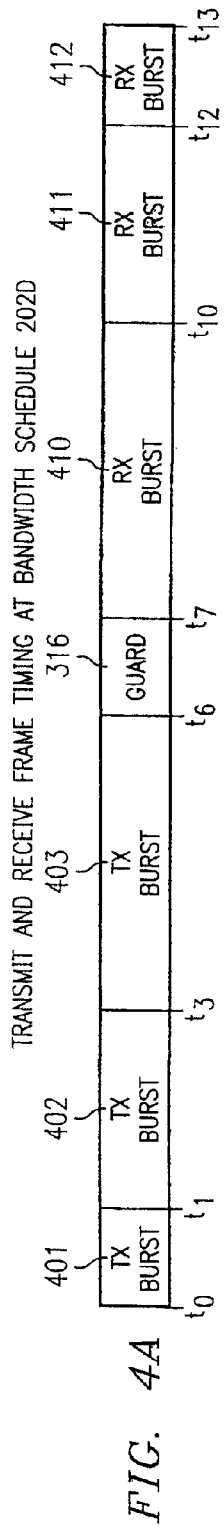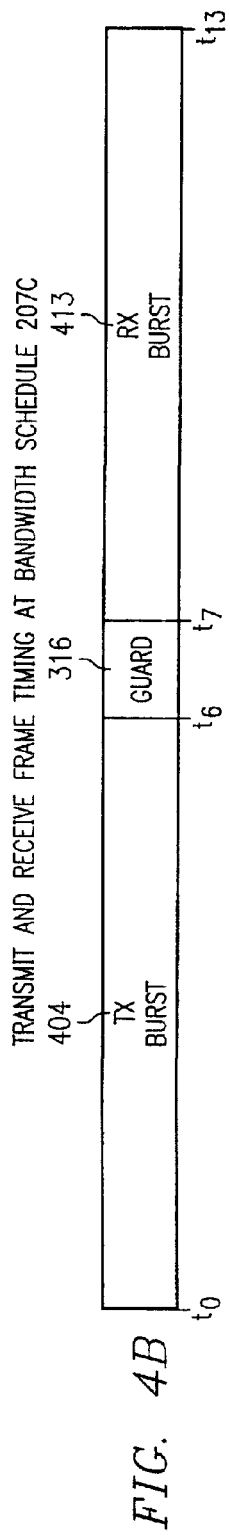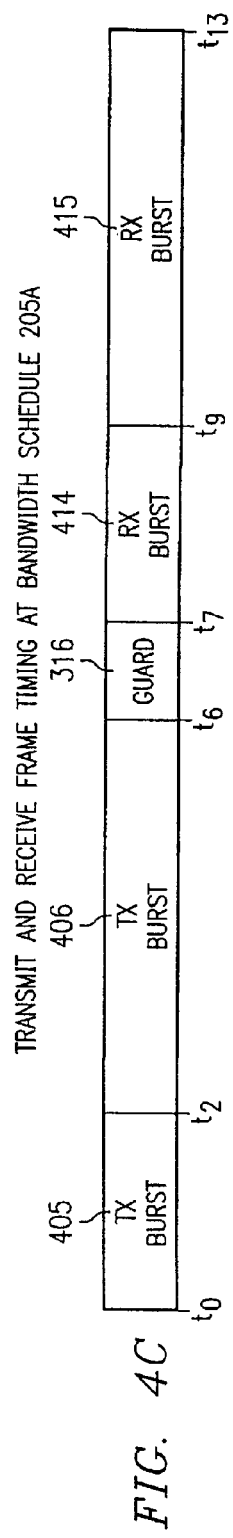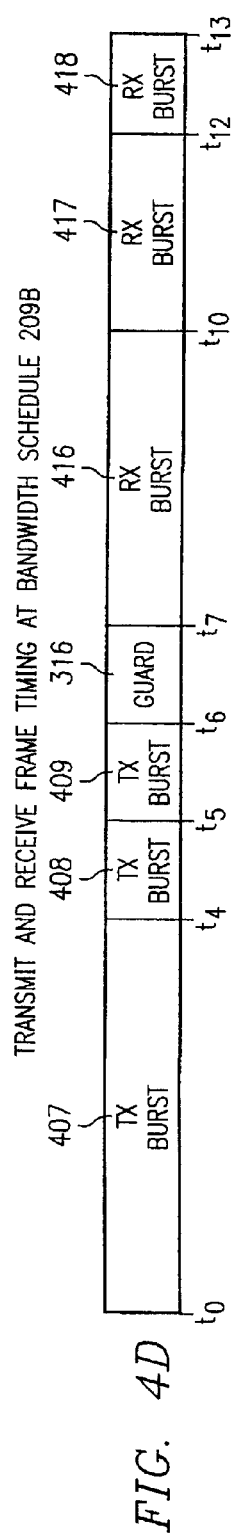

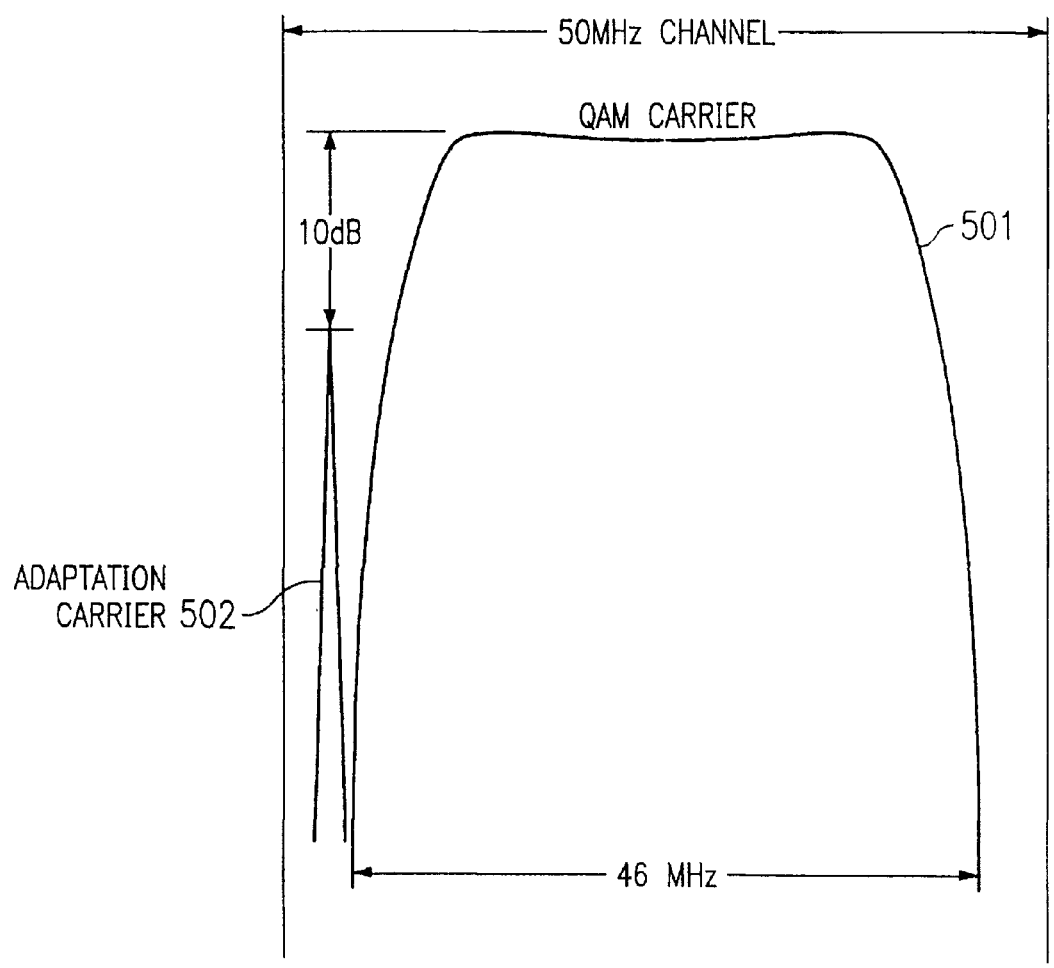

SYSTEM AND METHOD FOR INBAND SIGNALING FOR SECTOR SYNCHRONIZATION IN A WIRELESS COMMUNICATION SYSTEM

RELATED APPLICATIONS

The present application is related to co-pending commonly assigned U.S. patent application Ser. No. 09/434,707, entitled "SYSTEM AND METHOD FOR BROADBAND MILLIMETER WAVE DATA COMMUNICATION," co-pending, commonly assigned U.S. patent application Ser. No. 09/604,637, entitled "MAXIMIZING EFFICIENCY IN A MULTI-CARRIER TIME DIVISION DUPLEX SYSTEM EMPLOYING DYNAMIC ASYMMETRY," and co-pending, commonly assigned U.S. patent application Ser. No. 09/607,456,entitled "FREQUENCY REUSE FOR TDD," which are incorporated herein by reference. The present application is also being filed simultaneously with a commonly assigned U.S. patent application entitled "SYSTEM AND METHOD FOR FREQUENCY RE-USE IN A SECTORIZED CELL PATTERN IN A WIRELESS COMMUNICATION SYSTEM".

BACKGROUND OF THE INVENTION

The present invention relates to communication systems and methods and more particularly to a system and method for optimizing the bandwidth of a point to multipoint wireless system by synchronizing transmit and receive modes.

Wireless radio links have increasingly become important to provide data communication links for a variety of applications. For example, Internet Service Providers have begun to utilize wireless radio links within urban settings to avoid the installation expense of traditional wired connections or optical fiber. It may be advantageous to utilize wireless radio link systems to provide service to a plurality of users in a point to multipoint architecture. Point to multipoint systems typically consist of a plurality of hub units servicing a plurality of sub units (sometimes referred to as remote units, nodes, or subscriber units). The subs are typically associated with individual nodes on the system. For example, an individual sub unit may be connected to LAN to allow PC's on the LAN to bridge to other networks via the point to multipoint system. Each sub unit communicates via a wireless channel with a particular hub unit. In a point to multipoint system, the hub unit may control communication between a portion of the plurality of sub units associated with a particular coverage area. The hub units schedule transmit and receive bursts to and from sub units. The hub units may distribute data packets received from a particular sub unit to another sub unit within the same coverage area via such frames, to a traditional wired network backbone, or to another hub unit.

A point to multipoint system, such as disclosed in the above referenced and commonly assigned patent application entitled "FREQUENCY REUSE FOR TDD," contains a plurality of adjacently located hub units providing an aggregate coverage area. Additionally, these hubs may have their individual coverage areas divided into particular sectors—such as 30 or 90 degree sectors. Additionally, the hubs may utilize frequency division or other techniques to provide a plurality of communication channels.

Channel reuse techniques have developed to allow reuse of channels within a network without introducing unacceptable levels of interference. The purpose of these channel reuse techniques is maximize channel availability while avoiding co-channel interference between neighboring hubs. Clearly, these channel reuse techniques are valuable tools to increasing the bandwidth of point to multipoint systems. However, according to the present invention it has been realized that point to multipoint systems contain architectural characteristics that may be exploited to allow optimization of channel availability greater than that available with traditional channel reuse techniques while avoiding co-channel interference.

For example, data traffic over a point to multipoint system may be bursty, rather than at a fixed or continuous data rate. Specifically, an Internet browser application executed on a sub unit would typically require significant down link bandwidth while downloading HTML code from a website, but would require little or no bandwidth while a user reads the display associated with the HTML code. Additionally, the bandwidth requirements of many applications such as browsers may be asymmetric. Specifically, Internet browsers often download a large amount of data, but upload proportionally very little. Accordingly, point to multipoint systems may implement dynamic bandwidth allocation (DBA) techniques to maximize the data throughput associated with asymmetric, bursty traffic.

Accordingly, it is an object of the present invention to provide a system and method to maximize the bandwidth of point to multipoint systems in accordance with the unique characteristics of point to multipoint systems as between particular portions of the network.

It is an additional object of the present invention to provide a system and method for synchronized dynamic allocation of bandwidth.

It is an additional object of the present invention to provide a system and method for synchronization of receive and transmit modes of sectors or other portions of an associated group of hub units to maximize the bandwidth of point to multipoint systems.

It is an additional object of the present invention to provide a system and method for sector to sector telemetry in point to multipoint systems.

It is an additional object of the present invention to provide an efficient communication channel for use with the invention systems and methods that allows synchronization of neighboring hubs while permitting rapid dynamic allocation of bandwidth in individual hubs.

It is still an additional object of the present invention to provide a pattern of frequency re-use in a wireless communication system.

It is another object of the present invention to provide a repeatable pattern of frequency re-use in a wireless communication system comprised of sixteen cells in a four-by-four grid using two polarizations per communication frequency.

It is yet another object of the present invention to provide a repeatable pattern of frequency re-use in a wireless communication system comprised of sixteen cells grouped in four sub-clusters of four cells in which facing sectors in the pattern are synchronized.

It is a further object of the present invention to provide a method of reducing co-channel and/or adjacent channel interference by a pattern of frequency re-use.

These and other objects, features and technical advantages are achieved by a system and method which operate in a point to multipoint system comprising a plurality of hubs and a plurality of subs distributed within coverage areas associated with the hubs. The point to multipoint system preferably divides its communication bandwidth into channels utilizing spectrum division techniques, such as frequency division, time division, or orthogonal code division. Also, the hubs communicate to the subs within their coverage areas via sector antennae. By utilizing spectrum division and sector antennas, preferred embodiments of the point to multipoint system coordinate channel allocation via a channel reuse plan. Additionally, preferred embodiments divide individual channels into transmit and receive modes via a Time Duplex Division (TDD) scheme via the same channel. In this TDD scheme, a hub transmits information to subs in the transmit mode and receives information from subs in the receive mode. Moreover, the hubs of the point to multipoint system preferably may dynamically allocate bandwidth between the transmit and receive modes to achieve asymmetric communication modes. Also, the preferred embodiment subs utilizing the present invention comprise directional antenna.

Co-channel interference such as in adjacent sectors of neighboring hubs is a significant concern. Specifically, hub to hub exposure is problematic, since hub antennas are typically directed toward other hubs of the network in order to provide composite coverage of a service area. For example, preferred embodiment hubs may utilize sector antennas covering between 30 to 90 degrees in azimuth, which are oriented to face similar sector antennas at neighboring hubs. Sub unit exposure is not as a significant issue for the preferred embodiments point to multipoint systems, because sub units of these point to multipoint systems utilize highly directional antenna. Accordingly, the subs units may not be exposed to significant co-channel interference from other sub units or other hub units.

Channel reuse plans may be utilized to mitigate hub to hub co-channel interference. For example, by carefully assigning channels for use by the hubs of a network, reuse performance of approximately 1 may be achieved. Moreover, through advanced channel planning techniques, such as shown and described in the above referenced patent application, entitled "FREQUENCY REUSE FOR TDD", and as described below, higher channel reuse performance may be achieved.

Nonetheless, a method or system optimization that would permit greater channel reuse would allow greater bandwidth for the system as a whole. The present invention achieves this goal in one embodiment by synchronizing transmit and receive modes of hubs. One embodiment of the present invention synchronizes dynamic bandwidth allocation of facing sectors of a cluster of geographically adjacent hubs, while allowing other sectors of these hubs to independently allocate bandwidth through frequency reuse and facing sector synchronization. The hubs are adjacent in the sense that the hubs are the nearest neighbor hubs in a particular direction. In this embodiment, guard time between transmit and receive modes is minimized by preferably selecting a guard time to accommodate the synchronization distance of just over two hub coverage radii. For example, where a maximum reuse is 6R, a reuse schedule of 9, with 30 degree sectors, 4.5 km cells, the guard time is approximately 100 μs or approximately 5% of the embodiment's channel capacity to accommodate propagation from a maximum distance in the reuse cluster. However, as the present invention synchronizes facing sectors of adjacent hubs, the synchronization distance is greatly reduced. Accordingly, in this embodiment, the guard time only occupies 0.5% of the channel capacity. Moreover, the computation requirements of the system are significantly reduced in this preferred embodiment, as a much smaller portion of the network is synchronized with respect to any particular synchronization determination. Also, the facing sector synchronization simplifies the implementation of synchronization telemetry.

In another embodiment of the present invention, a pattern of frequency re-use is described where a repeatable pattern of cells is employed to allow for re-use of a number of frequency assignments where there are two polarization modes available per frequency. Such a pattern of frequency re-use is especially useful when the number of frequency assignments, or communication channels, available for operation of a communication system is limited. In order to provide sufficient coverage for a particular operating area, a pattern of cells that re-use the available frequencies must be provided in order to avoid dead spots or to avoid interference between adjacent channels on the frequency spectrum used in the same area, known in the art as "adjacent channel interference" or interference between two cells using the same frequency with the same polarization in adjacent areas, known in the art as "co-channel interference".

Idealizing the shape of the cells in the pattern as circular and further idealizing each cell as having a similar radius, the shape of a repeatable pattern of such cells can be viewed as an overlay on a flat surface. Obviously, such idealizations such as a flat surface and substantially identical cells spaced at uniform distances rarely occur in the real world. However, it is to be understood that the present inventive system and method is not limited to such idealizations but rather is applicable to real world situations where the overall frequency re-use pattern can be used while taking into account minor variations to allow for obstructions, terrain features, dissimilar cell sizes, irregular spacing of cells, etc. While the disclosure of the invention below will discuss an idealized repeatable pattern composed of idealized cells, etc., such idealizations should not be construed as limitations of the invention.

For cells of substantially the same size and circular in shape, one arrangement of those cells in a multi-cell pattern may be seen as a square grid where the edge of two cells that are adjacent in the same rank or the same file are tangent at one point. In such an arrangement, cells that are diagonally adjacent are not tangent. In another multi-cell arrangement, a cell in the pattern is tangent to each of six adjacent cells. Such a pattern would appear as a honeycomb shape if the cells are idealized to be hexagonal in shape.

The inventors have determined empirically that for cells with 90° sectors, a minimum of eight frequency assignments and two polarizations are required for efficient frequency re-use for broadband wireless access systems. This is a reasonable requirement of frequency/polarization assignments for 90° sectorized cells in a time division duplex ("TDD") system considering the size of a typical license allocation of frequencies on a worldwide basis. For example, in Europe, the anticipated license allocation is 2×112 MHz or 224 MHz for the 28 GHz band and approximately 500 MHz for the 42 GHz band. Most of the North American broadband wireless access operators have allocations in excess of 200 MHz. An emerging popular channel size is 28 MHz in Europe and 25 MHz in North America. These channel sizes coupled with the anticipated license allocation of frequencies allows for eight or more available frequency channels.

While 90° sectors have some disadvantages over smaller sector sizes, such as 60°, 45°, and 30° sectors, 90° sector size is the baseline for planning for almost all broadband wireless access operators and standards groups. For example, RF performance is somewhat compromised for wide sectors relative to narrow sectors. Cell diameter is reduced thereby requiring a greater number of hubs/cells to cover a given area. Wider sectors also give rise to a greater possibility of co-channel and adjacent channel interference.

Despite the operational drawbacks of 90° sectors, there are significant economical advantages to 90° sector plans. One advantage is the lower cost of outdoor gear. With 90° sectors, fewer sectors and hence fewer radios, antennas, and associated equipment, both primary and redundant, are required when compared with smaller-sized sectors. Additionally, a significant cost to operators are roof rights. Landlords tend to charge for the right to place equipment of the roof of their building based on the number of antennas so 90° sectors translates into lower cost for roof rights. Also, wider sectors provide greater RF coverage which is an important benefit in the early deployment of a system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4A to 4D each illustrate a timing diagram for a series of RX and TX frames associated with opposing sectors of adjacent hubs.

FIG. 5 illustrates an exemplary power density spectrum for a QAM carrier signal and an associated Adaptation carrier.

DETAILED DESCRIPTION

Figure 1:
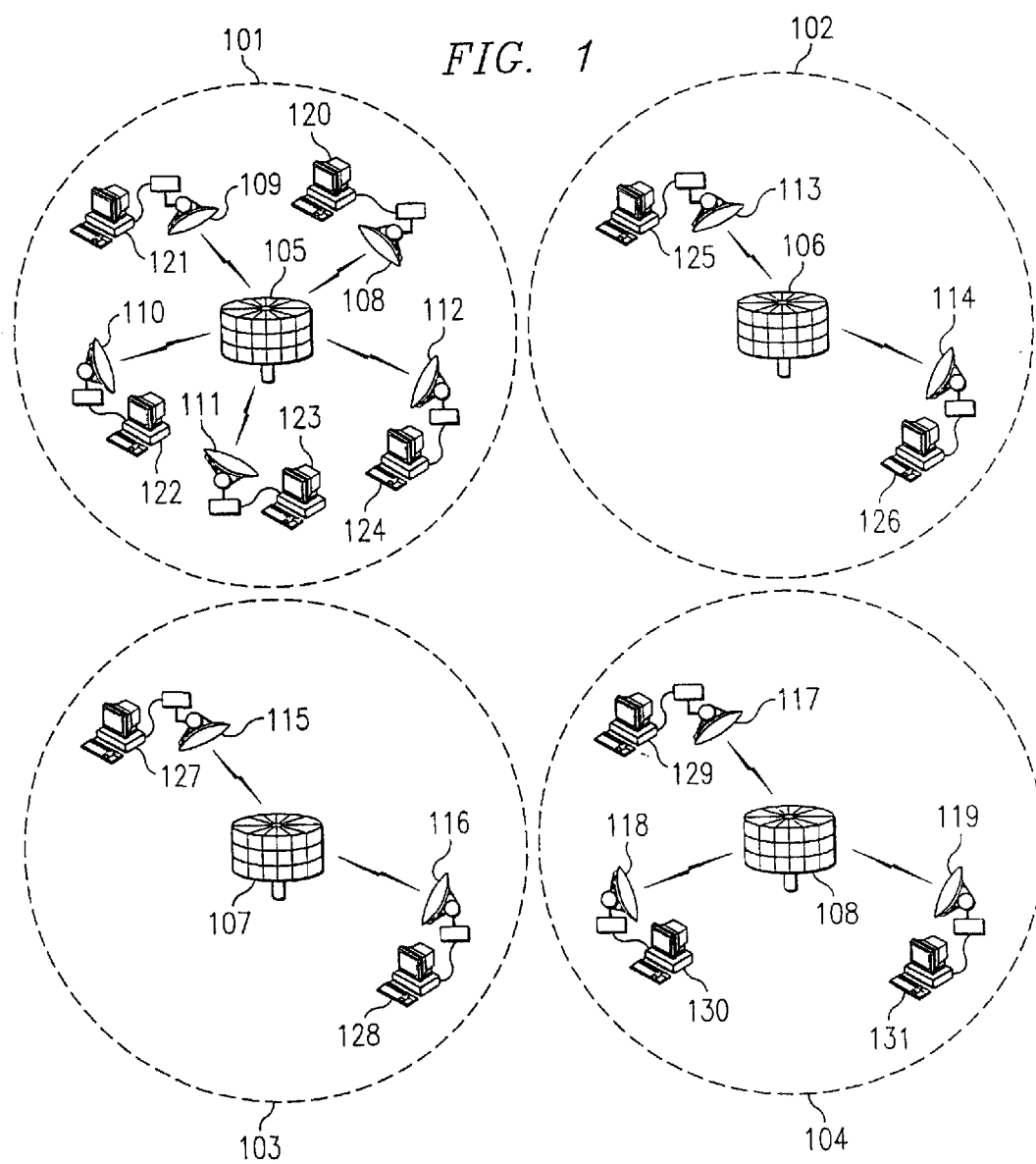
FIG. 1 depicts an illustrative example of a point to multipoint system arranged in a cluster architecture.

FIG. 1 illustrates an exemplary point to multipoint system utilizing the present invention. The system is preferably deployed in a cluster configuration. The illustrative cluster consists of a plurality of hubs (105, 106, 107, 108), although clusters in numbers different than the illustrated configuration may be employed according to the present invention. It shall be appreciated that communication networks utilizing the present invention may include additional clusters, either remotely located or adjacently located, with the clusters utilizing the present invention.

Hubs 105, 106, 107, and 108 provide coverage to cells 101, 102, 103, and 104. A plurality of subs (109–119) are deployed in cells 101, 102, 103, and 104, respectively. In addition, processor systems (120–131) are respectively associated with individual sub units. It shall be appreciated that sub units of a point to multipoint system may be alternatively associated with a LAN network of processors system. Alternatively, the sub units of point to multipoint system may be connected to an intermediate network. For example, a sub unit may be connected to an intermediate ATM switch. It shall further be appreciated that a system employing the present invention may contain an arbitrarily large number of hubs, cells, and sub units. For simplicity of describing the present invention, the exemplary embodiment has been described in terms of four cells.

Figure 2A:
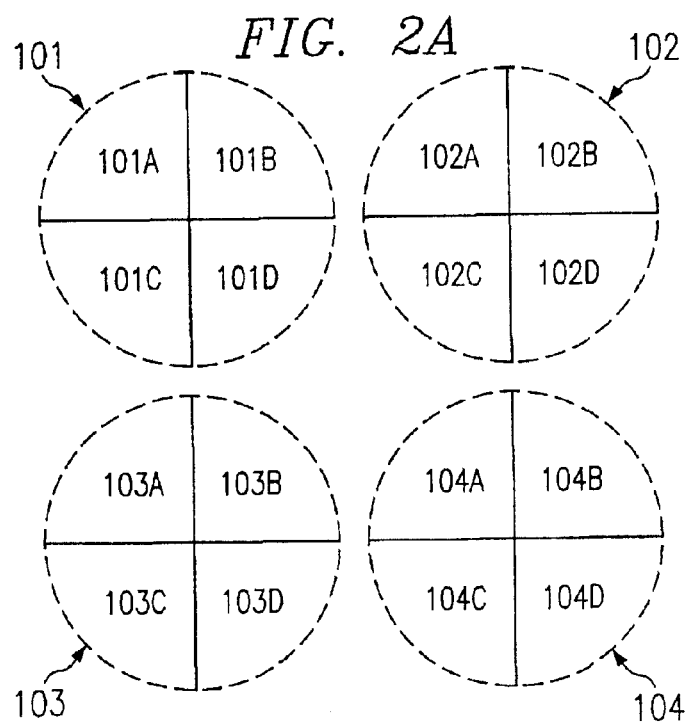
FIG. 2A depicts an illustrative sector configuration for the point to multipoint system set forth in FIG. 1.
Figure 2B:
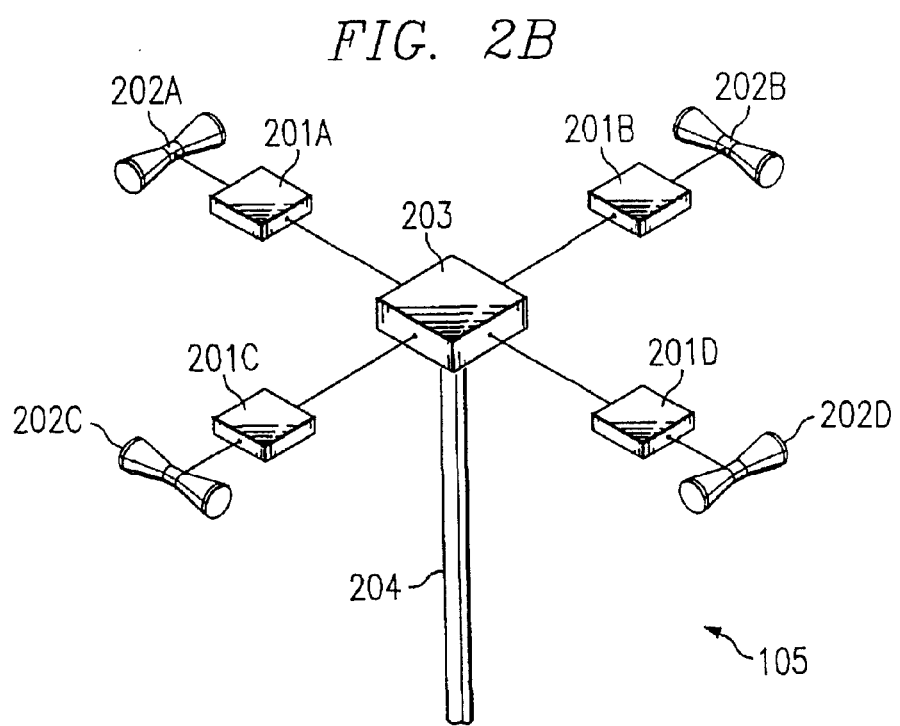
FIG. 2B illustrates a sectorized antenna arrangement for a hub for one of the cells in FIG. 2A.

FIG. 2A illustrates an exemplary sector configuration of the point to multipoint system set forth in FIG. 1. As previously noted, the system is divided into coverage areas associated with cells 101, 102, 103, and 104. Moreover, cells 101, 102, 103, 104, of the illustrated embodiment are sectorized into 90 degree sectors (101A–101D, 102A–102D, 103A–103D, and 104A–104D), although other sector sizes may be synchronized according to the present invention. Hubs 105, 106, 107, and 108 transmit and receive signals to/from the sectors via sector antennas, such as illustrated in FIG. 2B for the hub 105. The sector antennas 202A through 202D may utilize a discrete antenna element for each sector. Alternatively, the sector antennas may utilize a plurality of narrow beam antenna elements to synthesize sector coverage. In this configuration, energy from RF signals transmitted from a sector antenna associated with any of sectors 101D, 102C, 103B, and 104A may be detected in the other sector antennas of this group.

The spectrum allocated to the point to multipoint system as a whole is preferably subdivided into channels. Numerous methods of channel division may be utilized with the present invention, such as time division, frequency division channels, frequency hopping channels, and orthogonal code channels. The channels are divided into discrete sets. Additionally, the sets of channels are allocated among the sectors of the point to multipoint system in accordance with a reuse schedule. In this exemplary system, RF signals 302–307 are being transmitted upon the same channel for the purpose of illustrating the present invention. It shall be appreciated that other signaling may occur on other channels concurrently with the exemplary transmit and receive signals.

According to a preferred embodiment, at least adjacent sectors of a particular cell are provided different channel sets according to the channel reuse plan. For example, the channels assigned for use by sectors 104B and 104C are different from the channels assigned for use by sector 104A. However, depending upon the front and back isolation of the sector antenna, side lobe characteristics, and the like, channel sets may be reused in a cell, such as within sector 104B and 104C and/or 104A and 104D.

Figure 3:
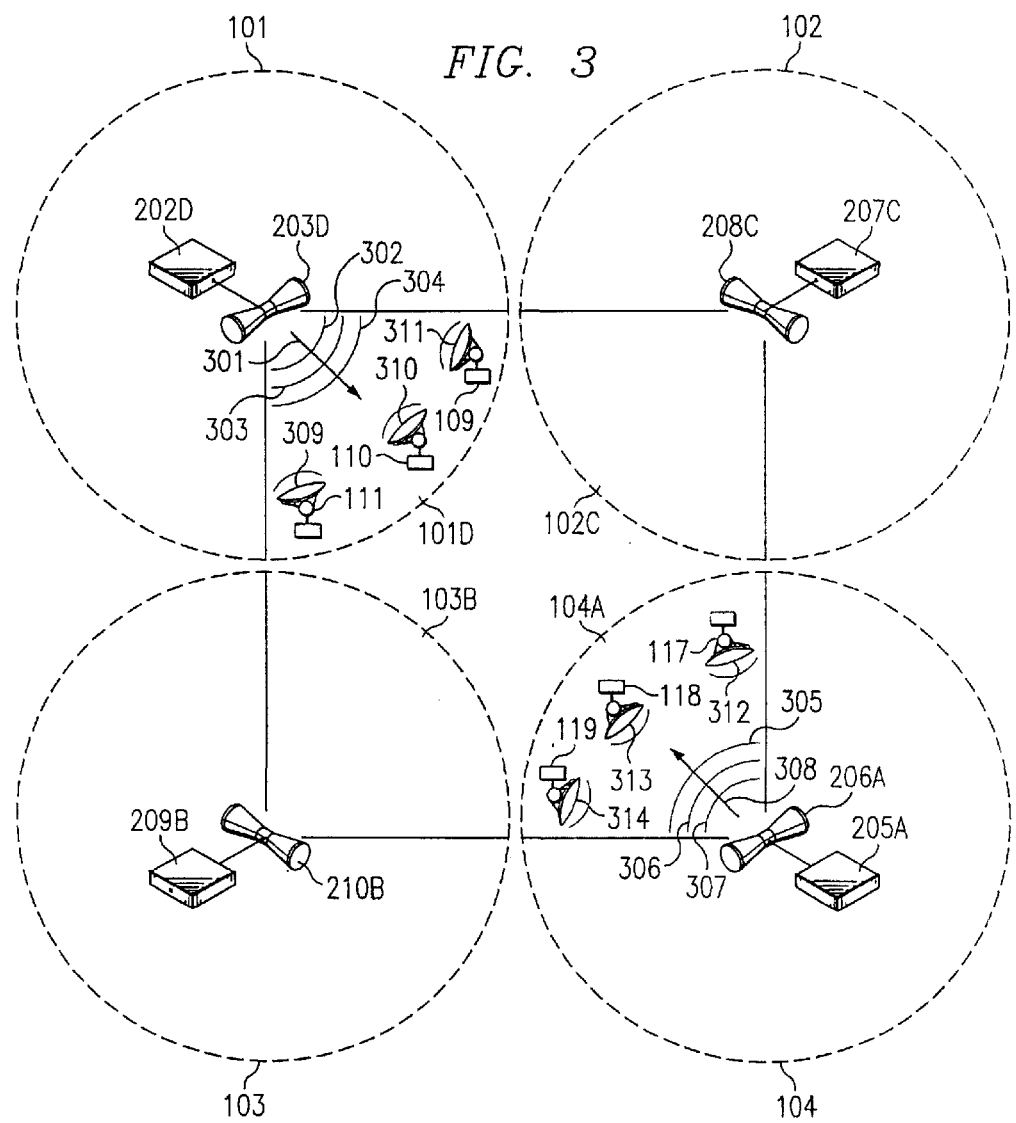
FIG. 3 illustrates particular sectors and the propagation of transmissions from hubs to a plurality of subs within the particular sectors.

FIG. 3 illustrates a series of RF transmit signals (301–306) broadcast from hubs 105 and 108, respectively. Hub 105 transmits a series of RF time burst or time slot signals (302, 303, and 304) with the signals propagating in direction 301 within sector 101D. Since hub 105 utilizes a sector antenna, the energy associated with RF signals 302, 303, and 304 propagates through out sector 101D. RF signal 302 comprises information for sub 109. RF signal 303 comprises information for sub 110. RF signal 304 comprises information for sub 111. Similarly, hub 108 transmits a series of RF time burst or time slot signals (305, 306, and 307) with the signals propagating in direction 308 within sector 104A. Since hub 104 utilizes a sector antenna, the energy associated with RF signals 305, 306, and 307 propagates through out sector 104A. RF signal 305 may comprise information for sub 117. RF signal 306 may comprise information for sub 118. RF signal 307 may comprise information for sub 119.

Eventually, RF signals 302, 303, and 304 will propagate beyond the confines of cell 104 into cells 101, 102, and 103. Accordingly, RF signals 302, 303, and 304 could cause co-channel interference in cells 101, 102, and 103. In the preferred embodiment point to multipoint system, the sub units utilize highly directional antennas directed toward an associated hub and therefore generally away from the remaining hubs of a cluster. Accordingly, the subs generally will not experience co-channel interference from RF signals 302, 303, and 304.

However, hubs 105, 106, and 107 will experience co-channel interference if the hubs are in receive mode with respect to the particular channels associated with RF signals 302, 303, and 304 when the RF signals arrive at the particular hub. According to a preferred embodiment, hub 108 utilizes the same set of channels for sector 104A as hub 105 utilizes for sector 101D, hub 106 uses for sector 102c, and as hub 107 uses for sector 103b. Accordingly, RF signals 302, 303, and 304 could cause co-channel interference depending upon their arrival time at hubs 106, 107, and 108.

It shall be appreciated that RF signals 302, 303, and 304 will have negligible effect if RF signals 302, 303, 304 arrive when hubs 106, 107, and 108 are in transmit mode. Similarly, RF signals 305, 306, and 307 may cause co-channel interference in hubs 105, 106, and 107, if the hubs are in receive mode with respect to the channels associated with the signals upon their arrival.

Additionally, the subs in sectors 101D and 104A broadcast RF signals 309–314. As previously noted, the sub units of the preferred embodiment of this system utilize highly directional antennas. The architecture of the system is such that the highly directional antennas focus the radiated RF energy within a very narrow beam centered upon the respective hubs. Accordingly, it is unlikely that the subs could couple with another antenna in the system to cause co-channel interference. It shall be appreciated that this exemplary system contemplates that RF signals 302–307 and RF signals 309–314 are being transmitted via the same frequency channel. Accordingly, the exemplary system illustrating the present invention controls the timing of RF signal transmissions in TDMA burst periods.

The preferred embodiment of the present invention and method synchronizes particular transmissions within a point to multipoint system to prevent hub transmission from causing co-channel interference. Of course, reception windows may also be synchronized in addition to or in the alternative to transmission window synchronization in accordance with the present invention. Depending upon the amount of isolation between channels, it may be possible to independently synchronize individual channels in adjacent sectors. By synchronizing individual channels, an adaptive time division duplex scheme may maximize throughput on a per channel basis. However, this approach requires greater processing capacity, and hence greater equipment costs and complexity, to calculate optimal receive and transmit asymmetries. Accordingly, the preferred embodiment synchronizes transmission and reception for all channels utilized within adjacent sectors. In this manner, the present system and method allows greater performance of the asymmetric time division duplex algorithms while maintaining costs and complexity at preferred levels.

FIGS. 4A through 4D set forth exemplary timing diagrams for transmit and receive frames for sectors 101D, 102C, 103B, and 104A of hubs 105, 106, 107, and 108. Each hub is preferably synchronized to begin its transmit mode at time $t_0$. Hub 105 transmits TX bursts 401–403, comprising information for subs 109–111, respectively. Hub 106 transmits TX burst 404 comprising information for sub 114. Hub 107 transmits bursts 405 and 406, comprising information for subs 115 and 116, respectively. Hub 108 transmits bursts 407–409, comprising information for subs 117–119, respectively. Also, each hub is preferably synchronized to end its transmit mode at time $t_6$.

Additionally, hubs 105–108 are further synchronized such that hubs 105–108 do not transmit from time $t_6$ to time $t_7$. Also, hubs 105–108 do not receive bursts from subs from time $t_6$ to time $t_7$. During this period, the delay in transmission and reception creates guard 316. The duration of guard 316 is preferably selected so that the RF signals associated with the respective bursts will propagate beyond any hub that may experience co-channel interference before the hub will enter receive mode. Adjacent sector synchronization causes the synchronization distance for this embodiment to be slightly more than two hub radii (the distance between hubs 105 and 108). Adjacent sector synchronization with proper reuse planning is sufficient, because non-synchronized sectors utilizing the channels will be sufficiently separately spatially or facing different directions to avoid co-channel interference.

An exemplary discussion of such frequency reuse planning is contained in the above reference patent application, entitled "FREQUENCY REUSE FOR TDD." In an environment utilizing frequency use, channels may be assigned to hubs and their respective sectors by storing assigned channels in non-volatile memory at a hub which is utilized to physically configure the hub during a configuration start-up operation. Alternatively, channels may be assigned upon a dynamic basis in accordance with dynamic channel assignment algorithms. In this case, a channel controller may implement a particular dynamic assignment algorithm and periodically communicate assigned channels to the hubs for use in the respective sectors.

After time $t_7$, hubs 105–108 are synchronized to enter the receive mode. At this point, hubs 105–108 may receive transmissions from their respective subs without detecting RF signals transmitted from the other hub. During the receive mode, hub 105 receives RX bursts 410–412 from subs 109–111, respectively. Hub 106 receives RX bursts 413 from sub 114. Likewise, hub 107 receives RX bursts 414 and 415 from subs 115 and 116, respectively. Hub 108 receives RX bursts 416–418 from subs 117–119, respectively. Hubs 105–108 are preferably synchronized to end their receive modes at time $t_{13}$.

Additionally, this embodiment provides other advantages. First, adjacent hubs are capable of direct communication and therefore may coordinate frame timing and/or channel allocation without the use of separate telemetry lines. Secondly, the telemetry bandwidth necessary to coordinate channel allocation in a synchronous manner is significantly reduced in the adjacent hub configuration. Moreover, adjacent sector synchronization requires much less computation capacity than cluster-wide synchronization.

It shall be appreciated that the present invention allows greater system utilization and performance through other considerations in addition to greater channel reuse. By synchronizing adjacent sectors or adjacent antenna beams, the present invention does not place any other arbitrary restrictions upon the transmit and receive asymmetries associated with other sectors or antenna beams. For example, it is possible that sub units in adjacent sectors aggregately require significant transmit bandwidth but little receive bandwidth at a particular moment in time. Concurrently, it is possible that sub-units of non-adjacent sectors may aggregately require inverse bandwidth requirements. If the entire group of sectors were synchronized, a portion of the bandwidth would be wasted in both the adjacent and non-adjacent sectors. Accordingly, the present invention operates the transmit and receive asymmetries of adjacent sectors independently of other asymmetries. By severing the asymmetries relationship, the system may adapt to bandwidth requirements that inherently vary throughout the system at various points in time.

It shall be further appreciated that the present invention does not requires that hubs 105–108 begin or end their transmit modes or receive modes at the exact times. However, more accurate synchronization reduces the guard time and thereby maximizes the system throughput. Moreover, the present invention does not require any particular allocation of channel bandwidth to subs. It shall be appreciated that any number of channel division techniques may be utilized. All of the bandwidth during a single transmit/receive cycle may be allocated to a particular sub. Alternatively, each sub in the sector may receive a designated portion of the available bandwidth per transmit/receive cycle in a TDM/TDMA scheme. Alternatively, the subs may be allocated bandwidth according to a polling scheme. The hubs may implement any number of algorithms to schedule bandwidth to particular sub units. The receive and transmit modes may be divided through other techniques. For example, the subs may employ a CSMA/CD technique to send bursts to the hubs. Alternatively, the system may employ a contention period and a contention free period for sub access to the communication channel.

It shall be appreciated that numerous other signaling may occur between the hubs and subs on the selected channel in conjunction with the present invention. For example, the hubs may transmit broadcast bursts intended for all sub units. The hubs may transmit control channel bursts. Additionally, the hubs may transmit a beacon signal containing timing information or a network allocation vector to allow sub units to synchronize with the hub. The signaling may include requests to transmit, permission to transmit, or acknowledgment of data bursts.

It shall be appreciated that present invention does not require rigid definition of the transmit and receive modes. For example, TDM/TDMA telephony systems rigidly define the timing and duration of receive and transmit modes to optimize the systems to carry voice traffic. In contrast, the present invention may operate within a system that has asymmetric transmit and receive modes. Also, the present invention may be employed in a system that dynamically changes the duration of the transmit and receive modes. Exemplary dynamic bandwidth allocation systems and methods that may be employed in conjunction with the present invention are described in the above referenced patent application, entitled "SYSTEM AND METHOD FOR BROADBAND MILLIMETER WAVE DATA COMMUNICATION." To facilitate dynamic variation of bandwidth allocated to transmit and receive modes according to a preferred embodiment, hubs possessing synchronized sectors of the preferred embodiment communicate the variations to corresponding hubs and/or a common control system. Accordingly, a further aspect of the present invention provides a telemetry communication channel for synchronizing transmit and receive modes of hubs subject to co-channel coupling.

Several approaches may be taken to provide this communication channel. Leased connections from a ILEC (incumbent local exchange carrier) may be utilized for the synchronizing telemetry. However, it is preferred to utilize communication resources associated with the point to multipoint system, rather than ILEC connections. Accordingly, sector synchronization telemetry may utilize a backhaul associated with the point to multipoint network. A backhaul may be implemented in any form of communication means, such as a broadband fiber-optic gateway or other broadband data grade connection, T1 communications lines, a cable communication system, or the like. However, a connection to the backhaul or other system connected to the backhaul is required for each hub of a cluster that implements sector synchronization utilizing such a control channel. Although this may be sufficient in many systems, it is not an optimal solution as particular systems may have hubs that are not connected to the backhaul.

FIG. 5 illustrates a preferred option for synchronization telemetry involving a narrow carrier band adjacent to the primary carrier band. In a preferred embodiment of the present invention, the spectrum of the point to multipoint system is divided into discrete 50 MHz channels. The primary data communication occurs via a Quadrature Amplitude Modulation (QAM) carrier 501 that occupies approximately 46 MHz. Additionally, narrow band adaptation carrier 502, preferably having a bandwidth of 130 kHz, is established in the guard space of the 50 MHz channel to provide the synchronization telemetry. The hubs preferably utilize 2-level FSK modulation to signal information via adaptation carrier 502. In a preferred embodiment, adaptation carrier 502 comprises a 100 kbps signaling rate, 10 dB C/N for $10^{-12}$ BER, ½ concatenated coding, and transmit power 10 dB below the QAM power level. By utilizing this type of channel, the control channel may be transmitted and/or received via the adjacent sector antenna beams of a particular cluster of hubs.

It shall be appreciated that narrow band adaptation carrier 502 provides a preferred signaling channel optimized for the 50 MHz system. However, it shall be appreciated that the telemetry control channel is not required to be implemented as a narrow band carrier. If the present invention is utilized in a broadband point to multipoint system, the telemetry control channel may be spread spectrum processed across a larger spectrum. Additionally, it is not required to located adaptation carrier 502 in guard space associated within a predefined channel. The adaptation carrier may be implemented utilizing distinctly allocated spectrum.

In a preferred embodiment, adjacent hubs utilizing the present invention may receive bandwidth requests from their respective sub units. The hubs may perform calculations based upon the bandwidth calculations. In this type of a system, a bandwidth controller may be located in one hub to receive the results of the bandwidth calculations via adaptation carrier 502. Alternatively, the bandwidth controller may by implemented as a separate system link to the respective hubs.

The bandwidth controller utilizes the received calculations to determine optimal transmit and receive mode durations for synchronized sectors. The controller hub utilizes the adaptation carrier to signal the determined transmit and receive mode durations to the hubs. At this point, the hubs utilize the durations to allocate transmit and receive resources to their respective subs within the adjacent sectors. It shall be appreciated that the controller may receive the bandwidth requests and perform the calculations directly. However, performing the calculations at the hubs is preferred, since it distributes the processing requirements more efficiently. Also, it shall be appreciated that the hubs may contain logic to control receive and transmit modes in the event that the adaptations carrier link is interrupted. For example, the hubs may temporarily revert to a predefined lengths for transmit and receive modes. Alternatively, the hubs may temporarily define receive and transmit modes of equal lengths.

For example, a bandwidth controller of the present invention may monitor the instantaneous traffic demands on both forward and reverse links to thereby determine the appropriate amount of ATDD and/or asymmetry at which to operate the carrier channels. The bandwidth controller of the preferred embodiment of the present invention is operable upon a processor (CPU) and associated memory (RAM) of a hub of the present invention. The controller may contain a record of adjacent antenna beams and respective channels in a non-volatile memory in order to effect the desired synchronization. Alternatively, the bandwidth controller may operate in an environment that dynamically varies sectors and/or dynamically assigns channel to various sectors. In this environment, the bandwidth controller may communicate with the portions of the system that effects the sector configuration and/or channel assignment algorithms to obtain information concerning adjacent antenna beams and their channels. Of course, additional and/or other apparatus, such as a general purpose processor based computer system having an appropriate algorithm controlling operation thereof, may be utilized for operation of the bandwidth controller of the present invention.

Figure 6A:
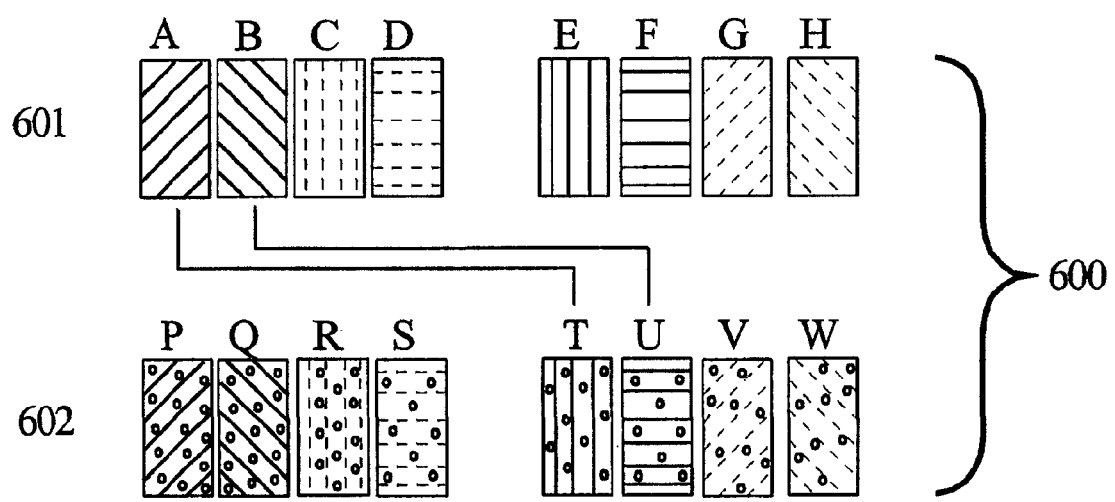
FIG. 6A illustrates a set of eight frequency channels with two polarizations per frequency channel for use in a frequency re-use pattern.

With reference now to FIG. 6A, the set 600 is a notional depiction of eight available frequency channels, also referred to herein as "frequencies", for a communication system with two polarizations available per frequency channel. The set 601 of frequencies are at one polarization and the set 602 of frequencies is at another polarization. Preferably, the polarizations of the frequency set 601 and the frequency set 602 are mutually orthogonal to minimize the possibility of interference between antennas operating at the same frequency but different polarizations as discussed further below. The polarizations can be, but are not limited to, horizontal and vertical alignments or slant left and slant right alignments.

It should be understood that although the discussion below develops frequency re-use patterns for eight frequencies and two polarizations, the present inventive system and method is not limited to eight frequencies and two polarizations. The principles on which the frequency re-use patterns herein disclosed are applicable likewise apply in situations where more than eight frequencies are available for the communication system deploying a frequency re-use pattern of the present inventive system and method.

Figure 6B:
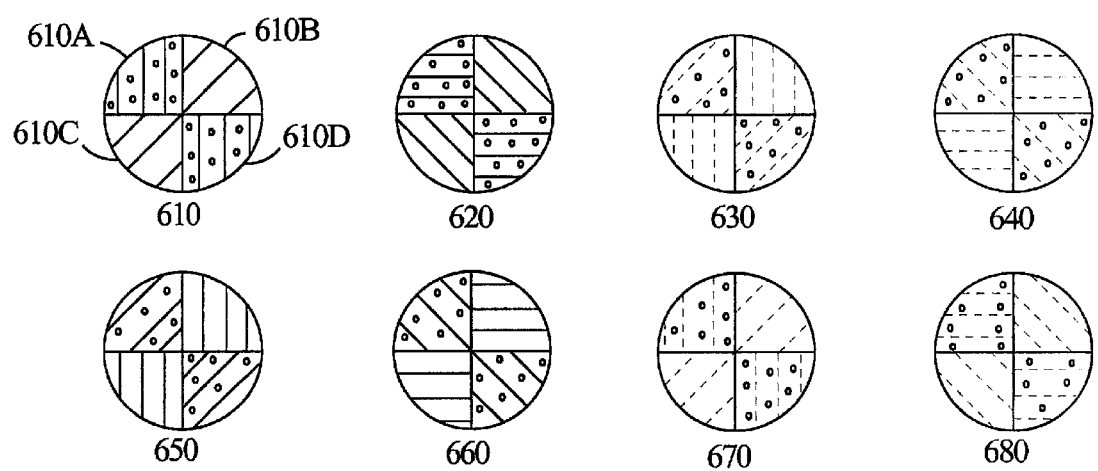
FIG. 6B illustrates eight unique cell types using the set of eight frequency channels with two polarizations per frequency channel illustrated in FIG. 6A.

FIG. 6B depicts eight cells, such as the cells illustrated in FIG. 2A, where each cell is divided into four 90° substantially non-overlapping sectors. The hub of each cell has at least one antenna per sector, for example the hub 105 shown in FIG. 2B. As shown in FIG. 6B, opposing sectors of a cell operate with the same frequency/polarization assignment. Taking cell 610 as an example, sectors 610A and 610D operate at frequency/polarization 601A while sectors 610B and 610C operate at frequency/polarization 602T. Although the sector designations are only shown for the cell 610, is it to be understood that the sector designations apply to every cell and are used throughout the specification and drawings. With eight frequencies and two polarizations per frequency available as shown in FIG. 6A, there are 16 unique frequency/polarization sector assignments, or "degrees of freedom", available. It is important for minimizing adjacent channel and co-channel interference in a frequency re-use plan to maximize the "distance" between the frequency/polarization sector assignments in a cell, i.e., the largest frequency separation and orthogonal polarization assignment is preferred. Additionally, for adaptive time division duplex systems ("ATDD") maximizing frequency separation minimizes coupling problems associated with independent dynamic asymmetric frame usage within a cell. The pattern of assignment of the 16 degrees of freedom as shown in FIG. 6A is preferred since that pattern results in the maximum "distance" between sector assignments for a cell. The present inventive system and method contemplates the use of other patterns of assignment of the 16 degrees of freedom.

Using the pattern of sector assignments discussed above, there are eight unique "cell types" available if each of the 16 sector assignments, or degrees of freedom, is used once. Each of the cells in FIG. 6B is of a unique cell type. The eight cell types will be arranged in a particular manner so as to minimize co-channel and adjacent channel interference while obtaining maximum coverage of an operating area for a communication system which has the frequency/polarization assignments of FIG. 6A.

Figure 7:
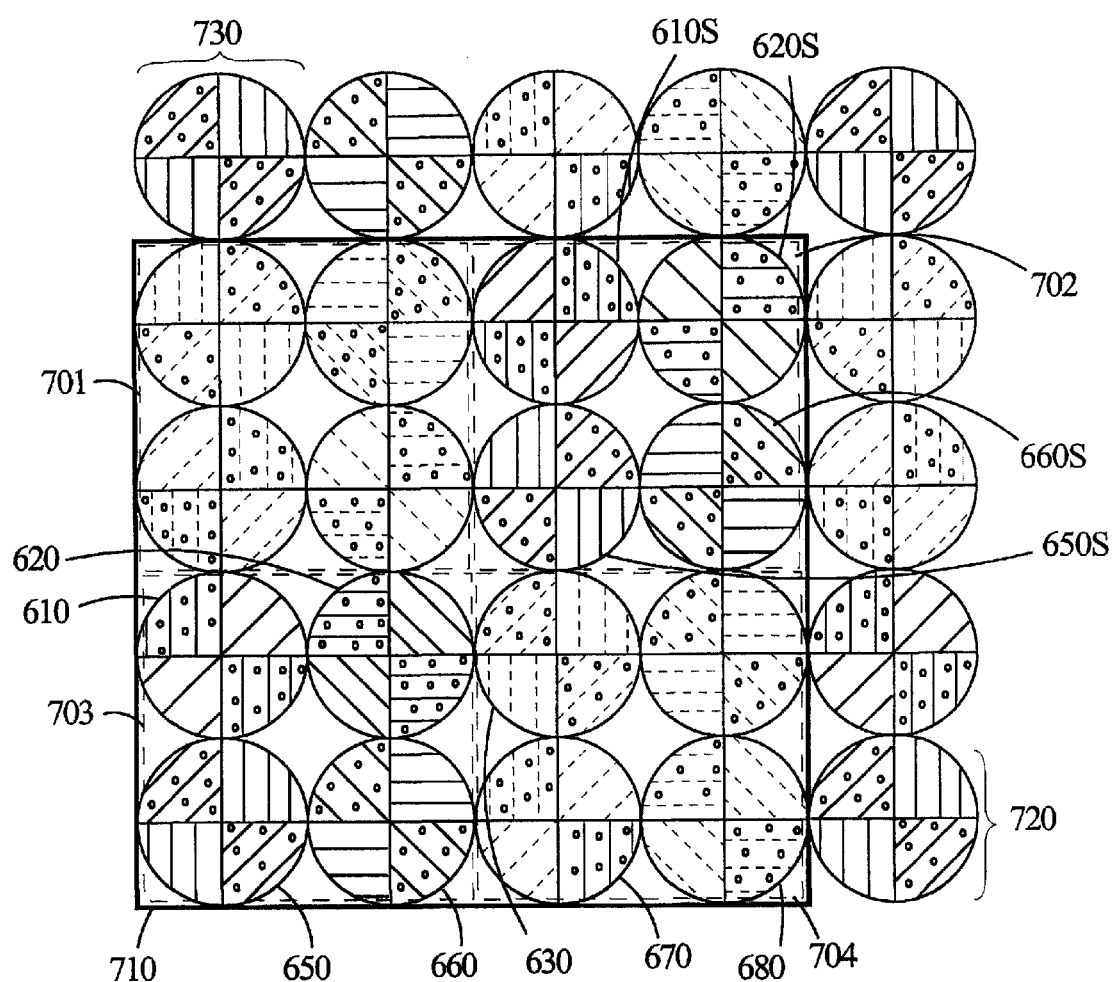
FIG. 7 illustrates a repeatable pattern of sixteen cells in a four-by-four rectilinear grid where each cell is divided into four 90° sectors where opposing sectors operate on the same frequency channel with the same polarization.

With attention now to FIG. 7, a section of a multi-cell frequency reuse pattern is depicted. As shown in the Figure, the 16-cell four-by-four rectilinear grid 710 is comprised of the four two-by-two groups, 701 through 704. The 16-cell grid 710 is repeatable vertically and horizontally, referenced to the orientation of FIG. 7, so as to be able to cover an area that is larger than the area covered by one instance of the grid 710. The cells in the grid 710 are arranged so that each cell occupies a unique rank and file position, where all the cells on the bottom row of FIG. 7 are in the rank designated 720 and where all the cells in the left-most column of FIG. 7 are in the file designated 730. The cells in the 16-cell rectilinear grid 710 are arranged so that rank and file adjacent cells are tangent but diagonally adjacent cells are not tangent. The rank and file designations are arbitrary and are only used as a convenience to accurately describe the arrangement of cells in the pattern. The rank and file designations are not part of the invention and should not be construed as limiting the invention in any way.

Figure 8:
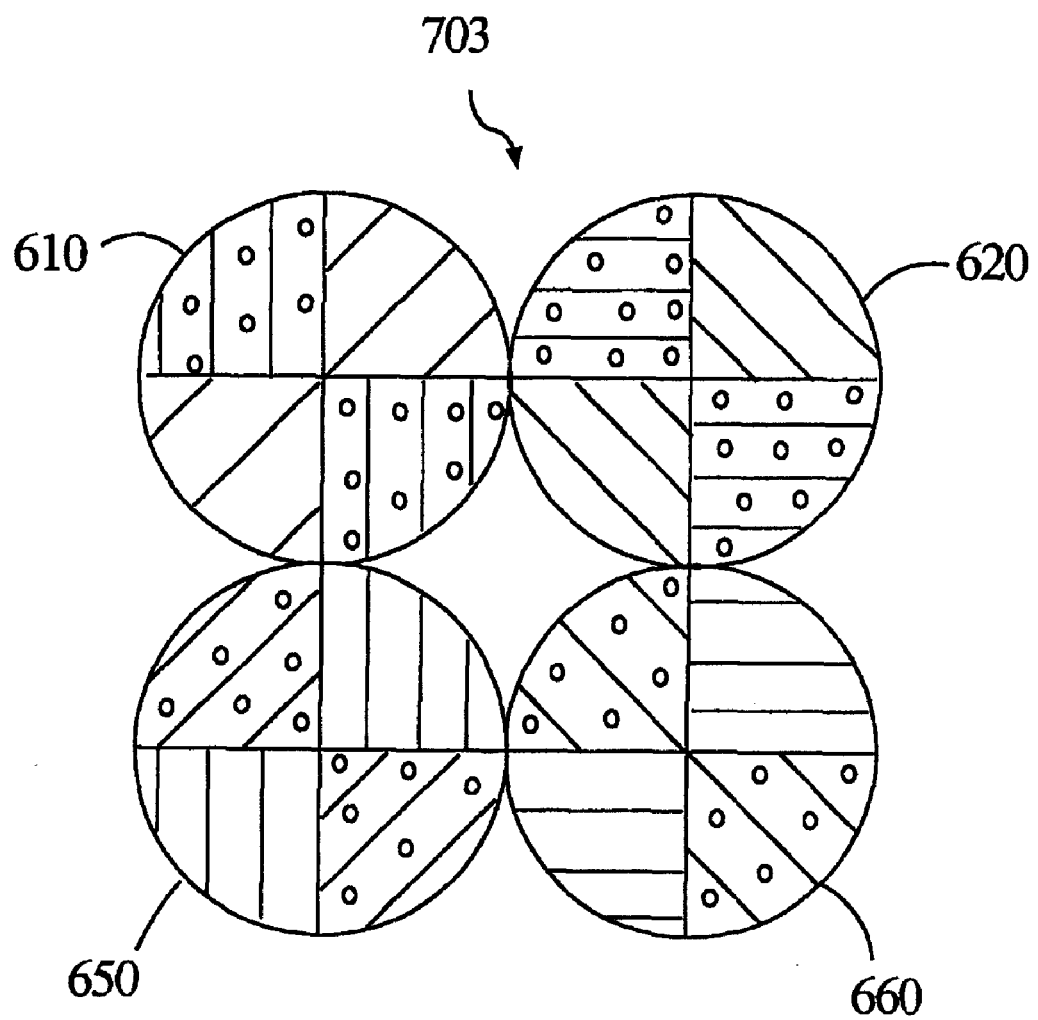
FIG. 8 illustrates one group of four cells from the repeatable pattern of sixteen cells in FIG. 7.

Referring now to FIG. 8, the 4-cell group 703, located in the lower left-hand quadrant of the rectilinear grid 710 in FIG. 7 is depicted. Each one of the four cells in the cell group 703 is a unique one of the eight cell types discussed above and shown in FIG. 6B. The cell 650 is tangent to its rank and file adjacent cells, i.e., the cell 650 is tangent to the cells 610 and 660. The cells 610, 620, 650, and 660 are oriented in the cell group 703 such that the polarization of facing cells for rank and file adjacent cells is not the same. For example, the sector 650B in the cell 650 is of one polarization while its facing sector in the rank adjacent cell 660, the sector 660A is of the other polarization (reference the two polarizations in FIG. 6A). By inspection of FIG. 7 and FIG. 8, it is shown that for each of the four cell groups, 701 through 704, the polarization of facing cells for rank and file adjacent cells is not the same. This orientation of the cells within a group works to minimize co-channel and adjacent channel interference as discussed above.

Referring back to FIG. 7, and with attention now to the cell group 704, each one of the four cells in the cell group 704 is a unique one of the eight cell types discussed above and shown in FIG. 6B. Additionally, each of the cells in the cell group 704 is of a different cell type from the cell types used in the cell group 703. In other words, of the eight cell types depicted in FIG. 6B, four of those cell types are used in the cell group 703 and the other four of those cell types are used in the cell group 704. The orientation of the cells in the cell group 704 is similar to the orientation of the cells in the cell group 703 as discussed above: the polarization of facing cells for the rank and file adjacent cells-is not the same. Furthermore, and preferably, the polarization of facing cells for the rank adjacent cells for the cells 620, 660, 630, and 670 are different, as shown in FIG. 7.

Having discussed the orientation and arrangement of the cells in the four cell groups, it should be noted that there is a relationship between the cells in the cell groups 703 and 702 as well as a relationship between the cells in the cell groups 704 and 701. Referring to the cell groups 703 and 702 in FIG. 7, it can be seen that the same four cell types appear in each of the cell groups and that the arrangement of the cells in each of the cell groups is the same, i.e., the cell 650 in the cell group 703 is the same cell type as the cell 650S in the cell group 702. However, the frequency/polarization assignments for each cell have been swapped between the pairs of opposing sectors. Whereas for the cell 650 in the cell group 703 the upper right and lower left sectors are of a first frequency/polarization combination, the same first frequency/polarization combination appears in the upper left and lower right sectors of the cell 650S in the cell group 702. The same is true for each cell in groups 703 and 702. Another way to view the relationship is that the cells in the cell group 702 have been rotated 90° from the orientation of the cells in the cell group 703. Likewise, the cells in the cell groups 704 and 701 are related in the same manner.

The reason for the change in orientation of the cells between cell groups 703/702 and 704/701 is to minimize co-channel interference between the sectors of the cells of the same cell type. If, for instance, the cell 650S was of the same orientation as the cell 650, the facing sectors 650A of the cell 650 and 650SC of the cell 650S would be operating on the same frequency with the same polarization. If a cell radius is designated as "R", the distance between the hubs of the cells 650 and 650S is $4R\sqrt{2}$. This distance may be insufficient to prevent co-channel interference. The swap of frequency/polarizations for the opposing sectors helps to overcome the problem of insufficient distance between the hubs. Using the frequency re-use plan of FIG. 7, the distance between hubs with facing sectors operating with the same frequency/polarization is $8R\sqrt{2}$, which is double the distance from the example above. The pattern described above for the four-by-four rectilinear grid 710 can be repeated horizontally and vertically in order to provide coverage for an area larger than the grid 710. As shown in FIG. 7, a rank and file of cells are repeated to illustrate the idea of horizontal and vertical repeatability. It is to be understood that the present invention is not limited to the specific number of cells shown in FIG. 7 nor to the specific assignment of cells types or sector orientations. It is contemplated that any repeatable rectilinear grid using the concepts described above are within the scope of the patent.

Figure 9:
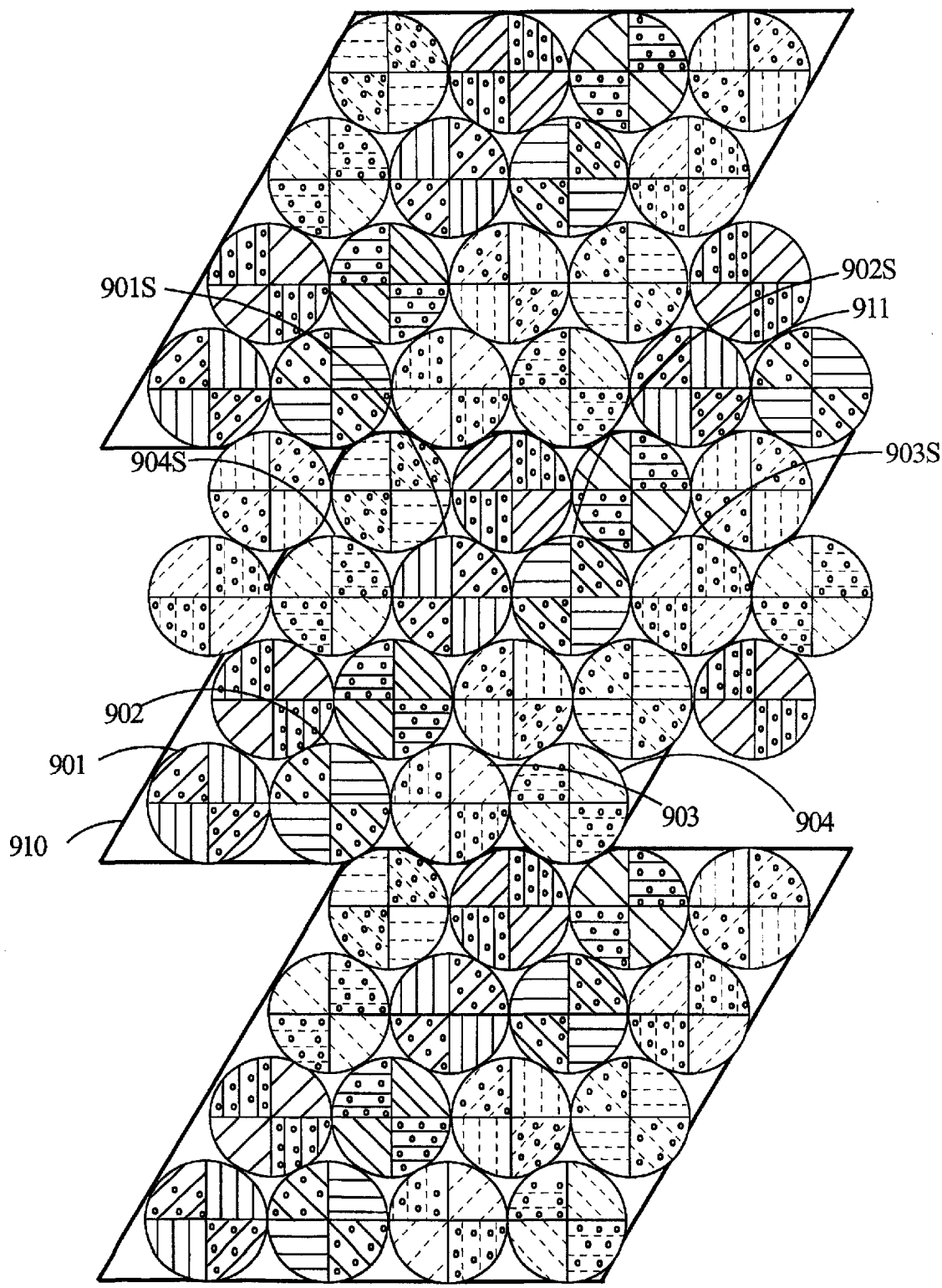
FIG. 9 illustrates a repeatable pattern of sixteen cells in a four-by-four grid forming a parallelogram where each cell is divided into four 90° sectors where opposing sectors operate on the same frequency channel with the same polarization.

Turning now to FIG. 9, a different pattern of cells is depicted, referred to herein as the "shift and squish" pattern. As can be seen from FIG. 7, the repeatable pattern of the rectilinear grid 710 allows for a sizeable area of dead space between the cells. The shift and squish pattern 910 eliminates much of that interstitial dead space. As with the rectilinear grid 710, the shift and squish pattern 910 comprises 16 cells of two each of eight cell types. The lower two rows of cells in the shift and squish pattern 910, similar to the lower two ranks of cells in the rectilinear grid pattern 710, are composed of one each of the eight cell types shown in FIG. 6B. Also, the two upper rows of cells in the shift and squish pattern 910 are composed of another set of one each of the same eight cell types as the lower two rows, similar to the upper two ranks of cells in the rectilinear grid pattern 710 being composed of another set of one each of the same eight cell types as the lower two ranks. However, unlike the rectilinear grid 710, the upper to rows of cells of the shift and squish pattern 910 are not arranged in the same relative orientation as the lower two rows of cells within the shift and squish pattern 910. For example, the cells 901 through 904 are arranged in the order, from left to right, 901/902/903/904 while the corresponding cells 901S through 904S are arranged, left to right, 904S/901S/902S/903S. The same relationship holds for the cells in the other two rows of the grid 910. Additionally, the frequency/polarization assignments of the two pairs of opposing sectors for the cells of a corresponding cell type are swapped.

The shift and squish pattern 910 is repeatable as shown in FIG. 9. The 16 cells in the pattern are arranged so that no one cell is tangentially adjacent, in any direction, to two cells of the same cell type. This relationship holds true as the pattern is repeated as shown in FIG. 9.

The spacing between hubs of cells having facing sectors operating with the same frequency/polarization in the shift and squish pattern 910, such as cells 901 and 911, is approximately 10R, which is approximately 88% of the distance between hubs with facing sectors operating with the same frequency/polarization in the rectilinear grid 710. The distance between the hubs of cells 901 and 911 should be sufficient to prevent co-channel interference.

Figure 10:
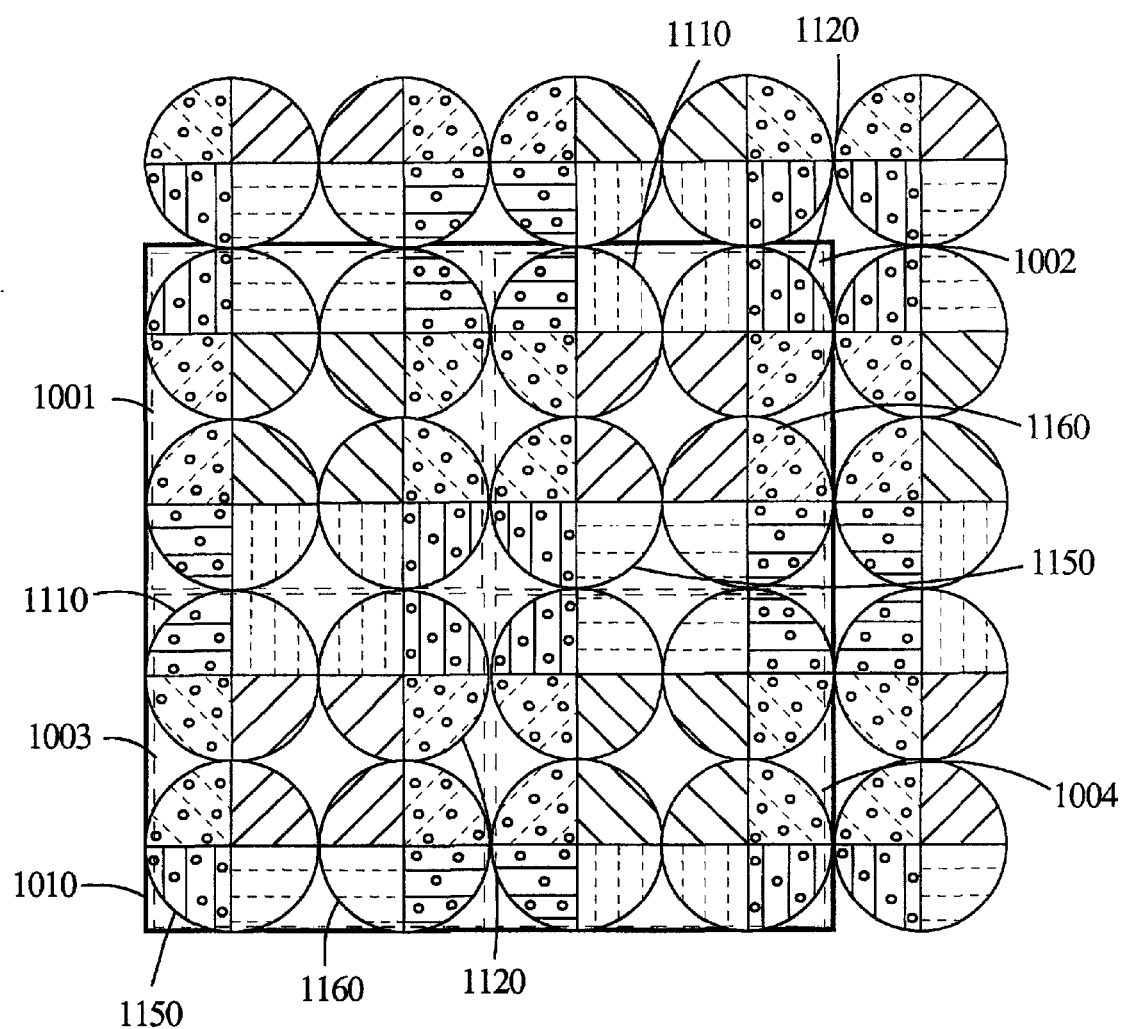
FIG. 10 illustrates a repeatable pattern of FIG. 7 where facing sectors operate on the same frequency channel and polarization to allow for transmit and receive synchronization between hub antennas of facing sectors.

With reference now to FIG. 10, a section of another multi-cell frequency re-use pattern is depicted. The 16-cell four-by-four rectilinear grid 1010 is comprised of the four two-by-two groups, 1001 through 1004. The 16-cell grid 1010 is repeatable vertically and horizontally, referenced to the orientation of FIG. 10, so as to be able to cover an area that is larger than the area covered by one instance of the grid 1010. The cells in the grid 1010, similar to the cells in the grid 710, of FIG. 7, are arranged so that each cell occupies a unique rank and file position and so that rank and file adjacent cells are tangent but diagonally adjacent cells are not tangent.

Figure 11A:
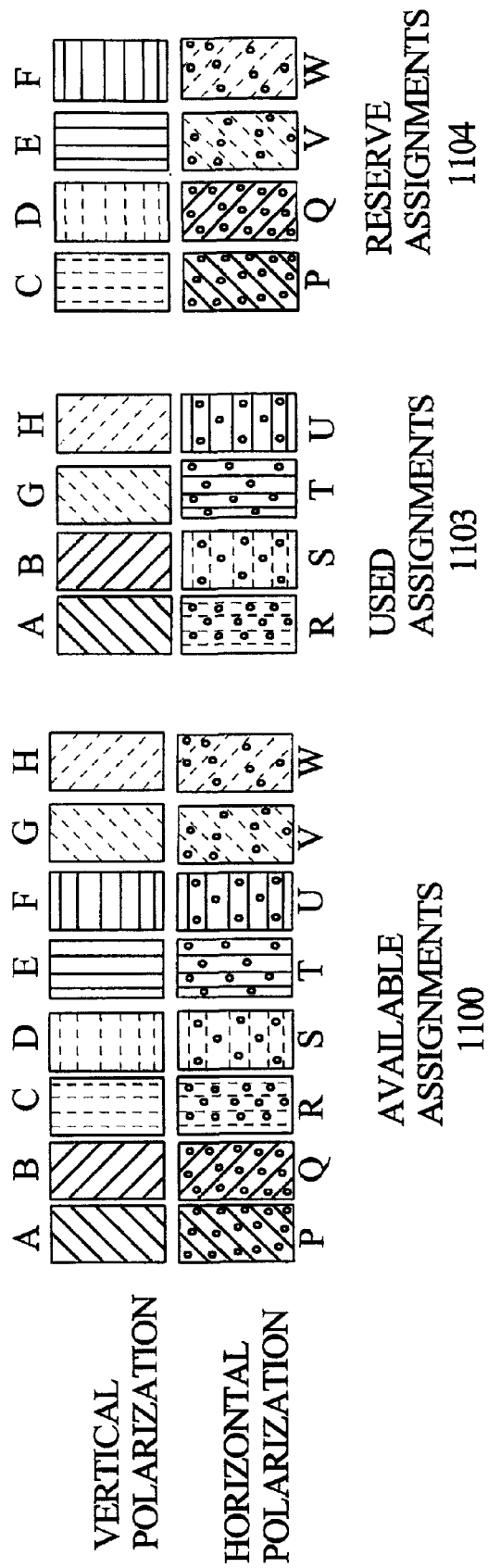
FIG. 11A illustrates the set of eight frequency channels with two polarizations per frequency channel shown in FIG. 6A indicating those frequency channels and polarizations used in the pattern in FIG. 10 and those frequency channels and polarizations not used in the pattern of FIG. 10 that are held in reserve.

FIG. 11A depicts the set 1100 of the eight available frequency channels used for a communication system with two polarizations available per frequency channel, similar to the set of frequencies 600 in FIG. 6A. Of the 16 frequency/polarization degrees of freedom in the set 1100, the set 1103 of eight frequency/polarization degrees of freedom and the set 1104 of the eight other frequency/polarization degrees of freedom are depicted. The set 1103 of degrees of freedom are used in the frequency re-use pattern of FIG. 10. The set 1104 of degrees of freedom are not necessary to populate the cells of the frequency re-use pattern of FIG. 10 and are held in reserve for possible late use, as described below.

Figure 11B:
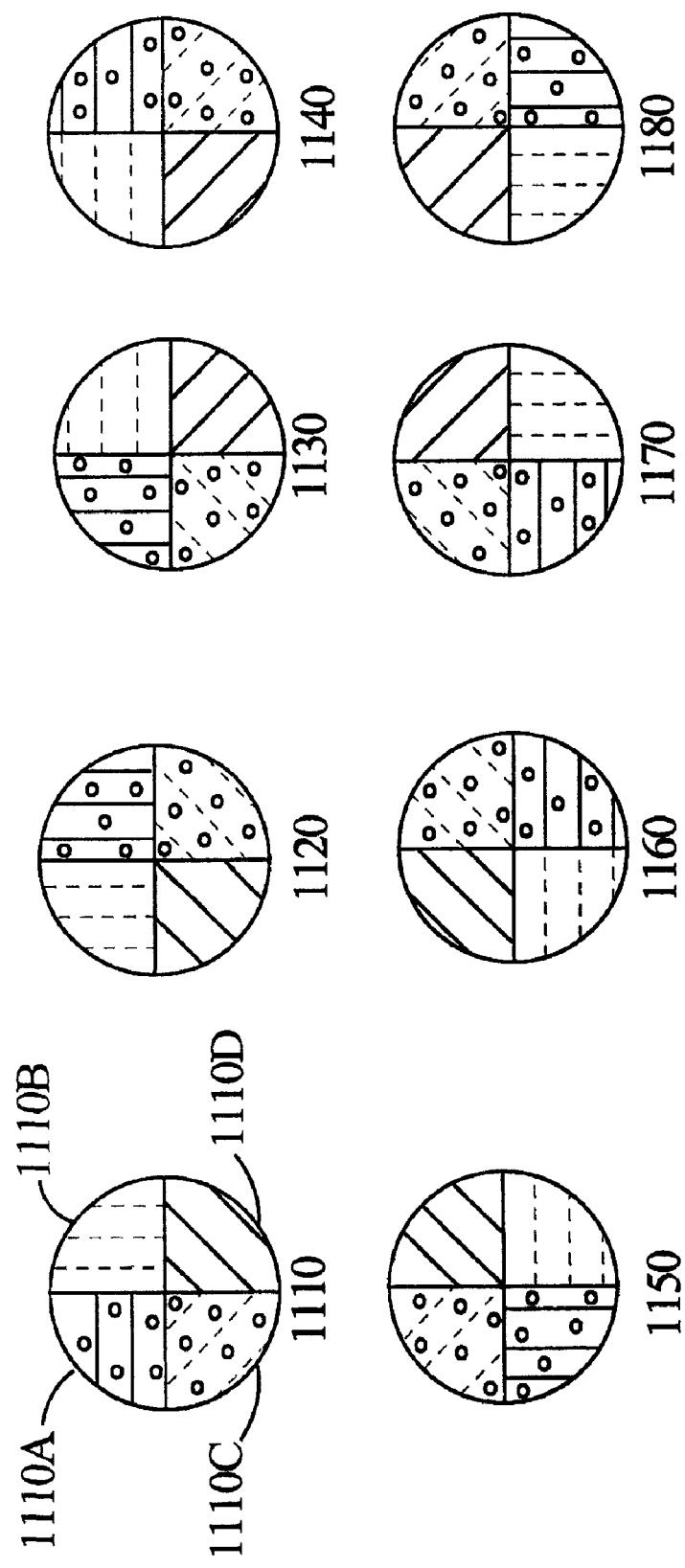
FIG. 11B illustrates eight unique cell types using the set of four frequency channels with two polarizations per frequency channel illustrated in FIG. 11A as being used in the frequency re-use pattern of FIG. 10.

FIG. 11B shows eight cell types used in the frequency re-use pattern rectilinear grid 1010 of FIG. 10. As shown in FIG. 11B, each sector of a particular cell of each of the eight cell types operates with unique frequency/polarization assignment relative to the other sectors of that cell. For each cell type, a pair of adjacent sectors operate with a first polarization and the other pair of adjacent sectors operate with a second polarization of the two available polarizations. Taking cell 1110 as an example, each sector 1110A through 1110D operates at a different frequency/polarization each from the other. With four frequencies and two polarizations per frequency available as shown in FIG. 11A, there are eight degrees of freedom available. With the limitations to be discussed below, eight different cell types are used to populate the rectilinear grid 1010.

Figure 12:
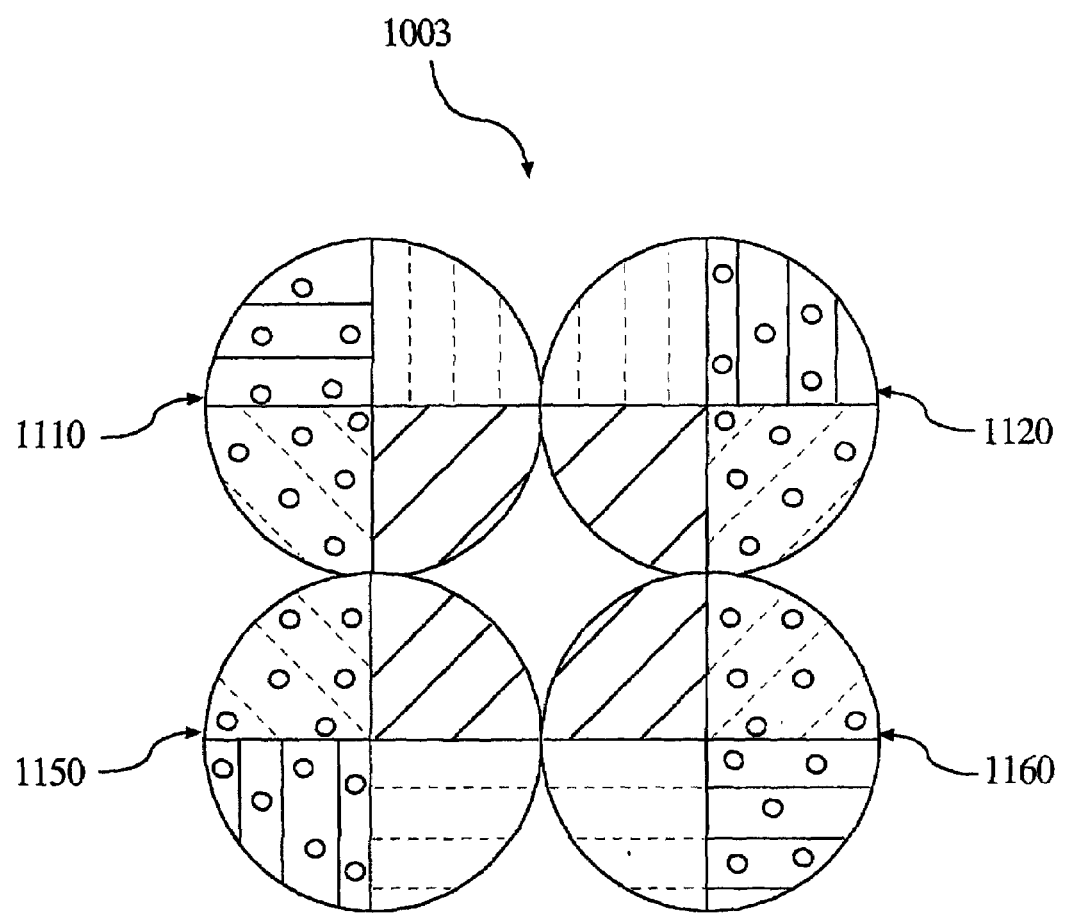
FIG. 12 illustrates one group of four cells from the repeatable pattern of sixteen cells in FIG. 10.

Referring now to FIG. 12, the 4-cell group 1003, located in the lower left-hand quadrant of the rectilinear grid 1010 in FIG. 10 is depicted. Each one of the four cells in the cell group 1003 is a unique one of the eight cell types discussed above and shown in FIG. 11B. Additionally, facing sectors for each cell in the 4-cell group 1003 are of the same frequency/polarization, regardless of whether the cell is rank and file adjacent or diagonally adjacent. For example, as shown in FIG. 12, the center-facing sectors for all four cells, 1110D, 1120C, 1150B, and 1160A, are all of the same frequency/polarization assignment. Additionally, the sector 1110C of the cell 1110 and the sector 1150A of the cell 1150 are facing and have the same frequency/polarization assignment. The same holds for the following sectors: 1150D and 1160C, 1160B and 1120D, and 1110B and 1120A. Furthermore, the opposing sectors of the diagonally adjacent cells in the 4-cell group 1003 have the same frequency/polarization assignment: the sectors 1150C and 1120B and the sectors 1110A and 1160D. These frequency/polarization assignments allow for repeatability of the pattern of rectilinear grid 1010, as seen in FIG. 10, while minimizing co-channel and adjacent channel interference.

Referring back to FIG. 10, and with attention now to the cell group 1004, each one of the four cells in the cell group 1004 is a unique one of the eight cell types discussed above and shown in FIG. 11B. Additionally, each of the cells in the cell group 1004 is of a different cell type from the cell types used in the cell group 1003. In other words, of the eight cell types depicted in FIG. 11B, four of those cell types are used in the cell group 1003 and the other four of those cell types are used in the cell group 1004. The orientation of the cells in the cell group 1004 is similar to the orientation of the cells in the cell group 1003 as discussed above: facing sectors for each cell in the 4-cell group 1004 are of the same frequency/polarization, regardless of whether the cell is rank and file adjacent or diagonally adjacent.

Having discussed the orientation and arrangement of the cells in the four cell groups, it should be noted that there is a relationship between the cells in the cell groups 1003 and 1002 as well as a relationship between the cells in the cell groups 1004 and 1001. Referring to the cell groups 1003 and 1002 in FIG. 10, it can be seen that the same four cell types appear in each of the cell groups and that the arrangement of the cells and the orientation of the sectors within the cells in each of the cell groups is the same, i.e., the cell 1150 in the cell group 1003 is the same cell type as the cell 1150S in the cell group 1002. Likewise, the cells in the cell groups 1004 and 1001 are related in the same manner.

The rectilinear grid 1010 can be repeated horizontally and vertically similar to the repeatability of the rectilinear grid 710. Note that all of the inward-facing sectors of any two-by-two grid of four cells within the repeated pattern have the same frequency/polarization assignments. Such an arrangement allows for the synchronization of those inward-facing sectors as described more fully above.

The distance between any two facing sectors with the same frequency/polarization assignment that are not adjacent facing sectors is $6R\sqrt{2}$. This distance should be sufficient to prevent co-channel interference between the non-adjacent facing sectors with the same frequency/polarization assignment. If there is co-channel interference, the two groups of four cells that have the interfering non-adjacent facing sectors can also be synchronized to avoid the co-channel problem.

Figure 13:
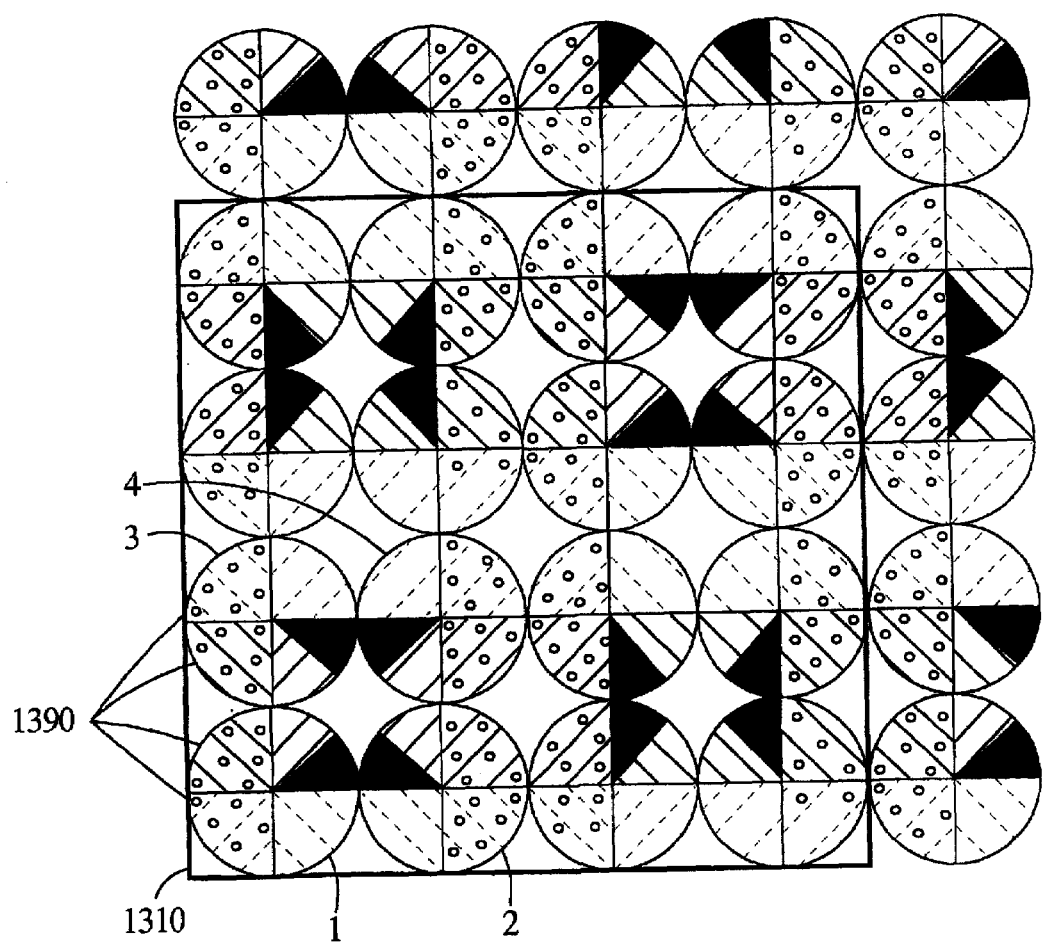
FIG. 13 illustrates the repeatable pattern FIG. 10 with an overlay of additional frequency channel sectors to accommodate an increase in the capacity demands of the users of the system.

With reference directed towards FIG. 13, a rectilinear grid 1310 is shown which is similar to the rectilinear grid 1010 of FIG. 10. However, the grid 1310 includes sector overlays for those sectors, herein referred to as incumbent sectors, for which the capacity of the system is insufficient to support the user demands in those sectors. The added sector overlays are indicative of an added antenna and corresponding circuitry at the hub of the cell in which the overlay lies, as is known in the art. The added sector overlay typically is not a simple replacement for the incumbent sector. The added overlay operates at a different frequency than the incumbent sector but with the same polarization. This configuration allows for the sharing of protection, or redundant, equipment between the incumbent and overlay sectors. The size of the overlay sectors is typically equal to or less than the size of the incumbent sector. As shown in FIG. 13, the overlay sectors are 45° sectors, but the present inventive system and method is not limited to 45° sectors. Additionally, FIG. 13 shows the overlay sectors 1390 added to one of each of the sectors of the four cells 1 through 4, which is merely an exemplary use of overlay sectors. The present inventive system and method is not limited to adding an overlay sector to groups of four facing sectors and it contemplates adding fewer or more overlay sectors as required by user demand. Adding overlay sectors to each of four facing sectors of four adjacent cells enables the four added overlay sectors to be synchronized in a manner similar to the synchronization of the underlying four incumbent sectors. Naturally, less than four overlay sectors can be added and synchronized as well.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for reducing co-channel interference in a wireless communication system, the wireless communication system comprising a cluster of hubs, each hub of the cluster comprising a plurality of antenna beams, the method comprising the steps of:
   identifying at least one data channel commonly utilized by adjacent antenna beams of the hubs, wherein each adjacent antenna beam has an orientation facing at least one hub of the hub cluster; and
   synchronizing signal communication over said at least one data channel within the adjacent antenna beams independently of signal communication over channels associated with non-adjacent antenna beams of the plurality of antenna beams of each hub.

2. The method of claim 1 wherein the synchronization step synchronizes transmission over said at least one data channel.

3. The method of claim 1 wherein the synchronization step synchronizes reception over said at least one data channel.

4. The method of claim 1, wherein communication occurs in a variable asymmetric time division duplex scheme.

5. The method of claim 4, wherein the synchronization step synchronizes communication of each channel utilized in the adjacent antenna beams.

6. The method of claim 4, wherein the synchronizing step includes the sub-steps of:
   receiving bandwidth request information; and
   determining transmit and receive bandwidth of said at least one data channel from the bandwidth request information.

7. The method of claim 6 wherein the receiving and determining sub-steps are performed at a controller unit.

8. The method of claim 4 wherein the synchronizing step includes establishing a guard time between transmission and reception, wherein the guard time approximately equals an amount of time required for a RF signal to propagate a longest distance between hubs within the cluster.

9. The method of claim 4 further comprising communicating synchronization information via a control channel, including at least one item from the list of:
   a start time of a transmit mode;
   an end time of a transmit mode;
   a start time of a receive mode;
   an end time of a receive mode;
   a duration of a transmit mode;
   a duration of a receive mode; and
   bandwidth request information.

10. The method of claim 9, where the control channel is transmitted via at least one of the adjacent antenna beams.

11. The method of claim 10 wherein the control channel is established in spectrum located immediately adjacent to said at least one data channel.

12. The method of claim 11 wherein the control channel is established in guard spectrum associated with said at least one data channel.

13. The method of claim 12 wherein the control channel has a bandwidth of 130 kHz.

14. The method of claim 13 wherein the synchronization information is signaled utilizing frequency shift keying.

15. A system for reducing co-channel interference in a wireless communication system, the wireless communication system comprising a cluster of hubs, each hub of the cluster comprising a plurality of antenna beams, the system comprising:
   means for identifying at least one data channel commonly utilized by adjacent antenna beams of the hubs, wherein each adjacent antenna beam has an orientation facing at least one hub of the hub cluster; and
   means for synchronizing signal communication over said at least one data channel within the adjacent antenna beams independently of signal communication over channels associated with non-adjacent antenna beams of the plurality of antenna beams of each hub.

16. The system of claim 15 wherein said means for synchronizing synchronizes transmission over said at least one data channel.

17. The system of claim 15 wherein said means for synchronizing synchronizes reception over said at least one data channel.

18. The system of claim 15, wherein communication occurs in a variable asymmetric time division duplex scheme.

19. The method of claim 18, wherein the synchronization means synchronizes communication of each channel utilized in the adjacent antenna beams.

20. The method of claim 19, wherein the means for synchronizing comprises:
   means for receiving bandwidth request information; and
   means for determining transmit and receive bandwidth of said at least one data channel from the bandwidth request information.

21. The system of claim 18 wherein the means for synchronizing establishes a guard time between transmission and reception, wherein the guard time equals the amount of time required for a RF signal to propagate a longest distance between hubs within the cluster.

22. The system of claim 18 further comprising means for communicating synchronization information via a control channel, including at least one item from the list of:
   a start time of a transmit mode;
   an end time of a transmit mode;
   a start time of a receive mode;
   an end time of a receive mode;
   a duration of a transmit mode;
   a duration of a receive mode; and
   bandwidth request information.

23. The method of claim 22 wherein the means for communicating transmits the control channel via at least one of the adjacent antenna beams.

24. The system of claim 23 wherein the control channel is established in spectrum located immediately adjacent to said at least one data channel.

25. The system of claim 24 wherein the control channel is established in guard spectrum associated with said at least one data channel.

26. The system of claim 25 wherein the control channel has a bandwidth of 130 kHz.

27. The system of claim 26 wherein means for communicating utilizes frequency shift keying to signal the synchronization information.

28. A method for maximizing data throughput of a cluster of hubs, each hub of the cluster comprising a coverage area divided into sectors, the cluster of hubs defining adjacent sectors, wherein each adjacent sector has an orientation facing at least one hub of the cluster, and the cluster utilizing a predetermined bandwidth with the bandwidth being divided into channels, the method comprising the steps of:
  assigning channels to the sectors wherein at least one channel is commonly assigned to each adjacent sector;
  causing the hubs of the adjacent sectors to transmit over said at least one channel in the adjacent sectors at a first same time;
  causing the hubs of the adjacent sectors to receive over said at least one channel in the adjacent sectors at a second same time;
  wherein the hubs transmit and receive over channels of non-adjacent sectors independently of transmit and receive timing of said at least one transmit channel.

29. The method of claim 28 wherein the first same time and the second same time are separated by an amount of time required for a RF signal to propagate a longest distance between hubs of the cluster.

30. The method of 28 wherein the hubs of adjacent sectors transmit at the first same time and receive at the second same time for every channel utilized in said adjacent sectors.

31. The method of claim 28 further comprising the steps of:
  receiving bandwidth request information; and
  determining the first same time and the second same time from the bandwidth request information.

32. The method of claim 31 further comprising the step of communicating synchronization information via a control channel.

33. The method of claim 32 wherein the control channel is transmitted in at least one of the adjacent sectors.

34. The method of claim 33, wherein the control channel is established in spectrum located immediately adjacent to said at least one channel.

35. The method of claim 34, wherein the control channel is established in guard spectrum associated with said at least one channel.

36. A system for maximizing data throughput of a cluster of hubs, each hub of the cluster comprising a coverage area divided into sectors, the cluster of hubs defining adjacent sectors, wherein each adjacent sector has an orientation facing at least one hub of the cluster, and the cluster utilizing a predetermined bandwidth with the bandwidth being divided into channels, the system comprising:
  means for assigning channels to the sectors wherein at least one channel is commonly assigned to each adjacent sector;
  processor device for calculating a first same time wherein the hubs of the adjacent sectors transmit over said at least one channel in the adjacent sectors at the first same time and for calculating a second same time wherein the hubs of the adjacent sectors receive over said at least one channel in the adjacent sectors at the second same time;
  wherein the hubs transmit and receive over channels of non-adjacent sectors independently of transmit and receive timing of said at least one transmit channel.

37. The system of claim 36 wherein the first same time and the second same time are separated by an amount of time required for a RF signal to propagate a longest distance between hubs of the cluster.

38. The system of claim 36 wherein the hubs of adjacent sectors transmit at the first same time and receive at the second same time for every channel utilized in said adjacent sectors.

39. The system of claim 36 further comprising a receiver for receiving bandwidth request information.

40. The system of claim 39 further comprising a transmitter for communicating synchronization information via a control channel.

41. The system of claim 40 wherein the control channel is transmitted in at least one of the adjacent sectors.

42. The system of claim 41, wherein the control channel is established in spectrum located immediately adjacent to said at least one channel.

43. The system of claim 42, wherein the control channel is established in guard spectrum associated with said at least one channel.

* * * * *